(12) United States Patent
Krantz et al.

(10) Patent No.: US 6,249,113 B1
(45) Date of Patent: Jun. 19, 2001

(54) HAND HELD SENSOR AND DISPLAY

(75) Inventors: Norman L. Krantz, San Jose; Donald D. Kook, Los Gatos, both of CA (US)

(73) Assignee: Zircon Corporation, Campbell, CA (US)

(*) Notice: Subject to any disclaimer, the term of this patent is extended or adjusted under 35 U.S.C. 154(b) by 0 days.

(21) Appl. No.: 09/134,157

(22) Filed: Aug. 14, 1998

(51) Int. Cl.$^7$ ................................................. G01R 19/00
(52) U.S. Cl. .................................................................. 324/67
(58) Field of Search ........................... 324/67, 671, 225, 324/228, 243, 326, 658, 662, 667, 133, 207.16, 207.26, 672, 202

(56) References Cited

U.S. PATENT DOCUMENTS

| | | | |
|---|---|---|---|
| 4,099,118 | 7/1978 | Franklin et al. | 324/61 R |
| 4,464,622 | 8/1984 | Franklin | 324/67 |
| 5,746,004 | 5/1998 | Wertheim | 33/768 |
| 6,023,159 | * 2/2000 | Heger | 324/67 |

OTHER PUBLICATIONS

Stanley "Intellisensor Stud Sensor", 4 photos.
National "EZ380B", 5 photos.
Tajima "DX", 2 photos.

* cited by examiner

*Primary Examiner*—Christine Oda
*Assistant Examiner*—Anthony Jolly
(74) *Attorney, Agent, or Firm*—Skjerven Morrill MacPherson LLP; Norman R. Klivans

(57) ABSTRACT

An improved hand-held sensor having a recessed LED array for indicating the location of an object behind a wall surface. The array displays in an arrow shaped format the location of the sensor relative to the object. The LED's can be offset both laterally and in depth from the surface of the sensor exterior case and are recessed from the surface. The sensor includes a soft feeling slip-resistant gripping surface for the user. One form of the sensor includes a slide switch actuator, which is retained in one wall of the sensor case to enable actuation of a switch mechanism without physical loading on the switch mechanism.

21 Claims, 7 Drawing Sheets

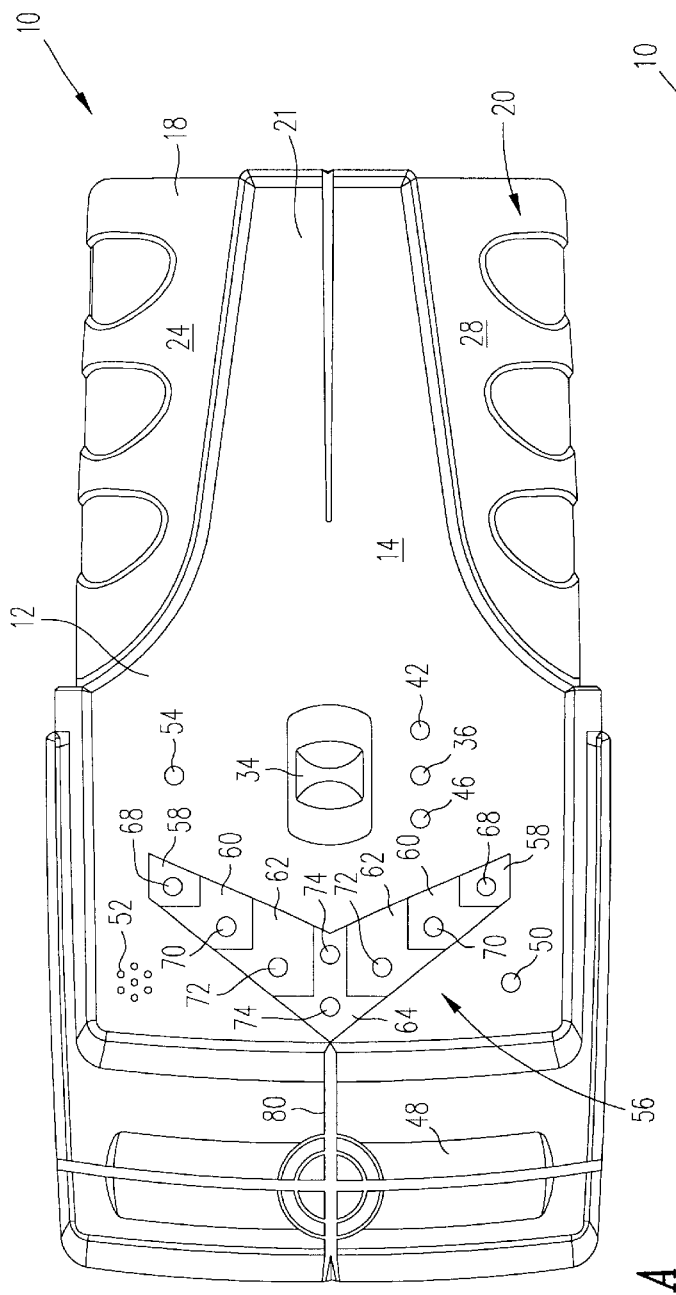
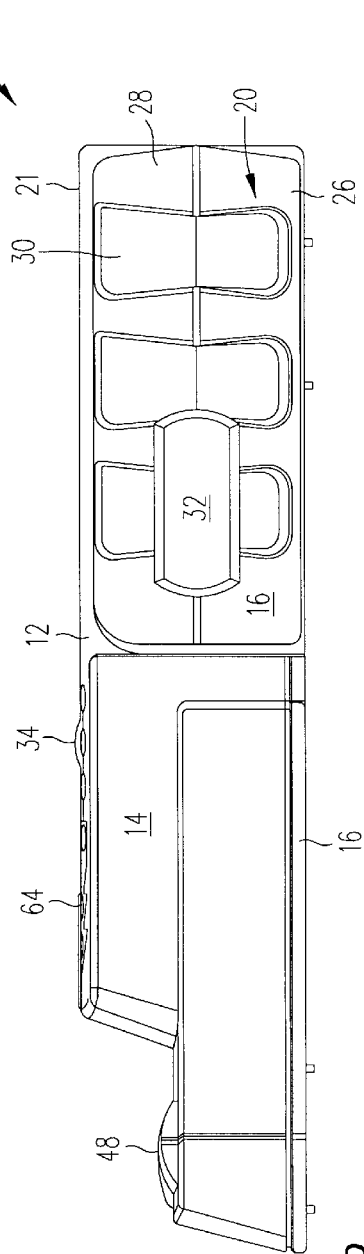
FIG. 3A
FIG. 3B

HAND HELD SENSOR AND DISPLAY

BACKGROUND

1. Field of the Invention

The present invention relates generally to hand-held sensors, such as for sensing objects of varying density in or adjacent walls, and in particular to a sensor with improved handling, display, and actuation.

2. Description of Related Art

Hand-held sensors are generally well known, such as disclosed in U.S. Pat. Nos. 4,099,118 and 4,464,622, which are incorporated herein by reference. These sensors measure the change in capacitance sensed by the a sensor circuitry as the sensor is moved across a wall. Typically, the capacitance varies due to studs, metal objects, pipes or other structural differences such as electrical wiring. The sensors generally display, such as with one or more light emitting diodes (LED's) the presence of such a change in capacitance indicating the presence of a stud or other object. The circuitry can detect and indicate the presence of an alternating current (AC) source in or behind the wall.

The exterior cases of the hand-held sensors generally are formed from a hard thermoplastic material, which can include various types of ridges or other similar raised gripping surfaces. Nonetheless, such cases inherently are slippery and can become more slippery due to moisture, such as due to the user's perspiration or rain. Further, unlike most hand tools which are held in a single manner and position during utilization, the hand-held sensors are held in a multitude of positions at many different angles, such as for scanning ceilings or walls above or below a user's height.

The sensors include one or a plurality of LED's to indicate the sensed change in capacitance or for other functions, such as calibration and/or AC source sensing. The LED's generally are arranged in a vertical or horizontal row across the sensor case, although one display, model number EZ380B, made by National in Japan includes a somewhat arrow shaped orientation of LED's. These LED displays are either covered by a transparent cover, such as in the National display, or are exposed and can protrude beyond the casing wall of the sensor, such as the vertical aligned LED display in a sensor sold under the name "Intellisensor Stud Sensor" made by The Stanley Works in New Britain, Connecticut. The exposed LED's or transparent covers can be scratched, damaged or broken when being stored or transported, or if dropped.

The actuators, especially when designed as slide actuators, can be of a complicated design and can bear against the switch mechanism or the circuitry and can cause defects in the sensor. The actuators often are glued or adhered to the switch mechanism and hence are subject to breakage.

It would be desirable to provide a hand-held sensor which is easily gripped, does not have exposed LED's and has an actuator which is easily manufactured, not subject to breakage and does not load the switch mechanism or circuitry.

SUMMARY

An improved hand-held sensor having a recessed LED array for indicating the location of an object behind a wall or other surface. The array displays in an arrow shaped format the location of the sensor relative to the object. The LED's can be offset both laterally from one another and in depth from the surface of the sensor exterior case and are recessed from the surface in which the LED's are mounted. The sensor includes a soft feeling slip-resistant gripping surface for the user on a rear portion of the sensor. One form of the sensor includes a slide switch actuator, which is retained in one wall of the sensor case to enable actuation of a switch mechanism without physical loading on the switch mechanism.

BRIEF DESCRIPTION OF DRAWINGS

FIGS. 3A and 3B are respective top and side views of the sensor of FIG. 1.

Utilization of the same reference numerals in different FIGS. indicates similar or identical elements, structurally and/or functionally.

DETAILED DESCRIPTION OF THE PREFERRED EMBODIMENT

Figure 1:
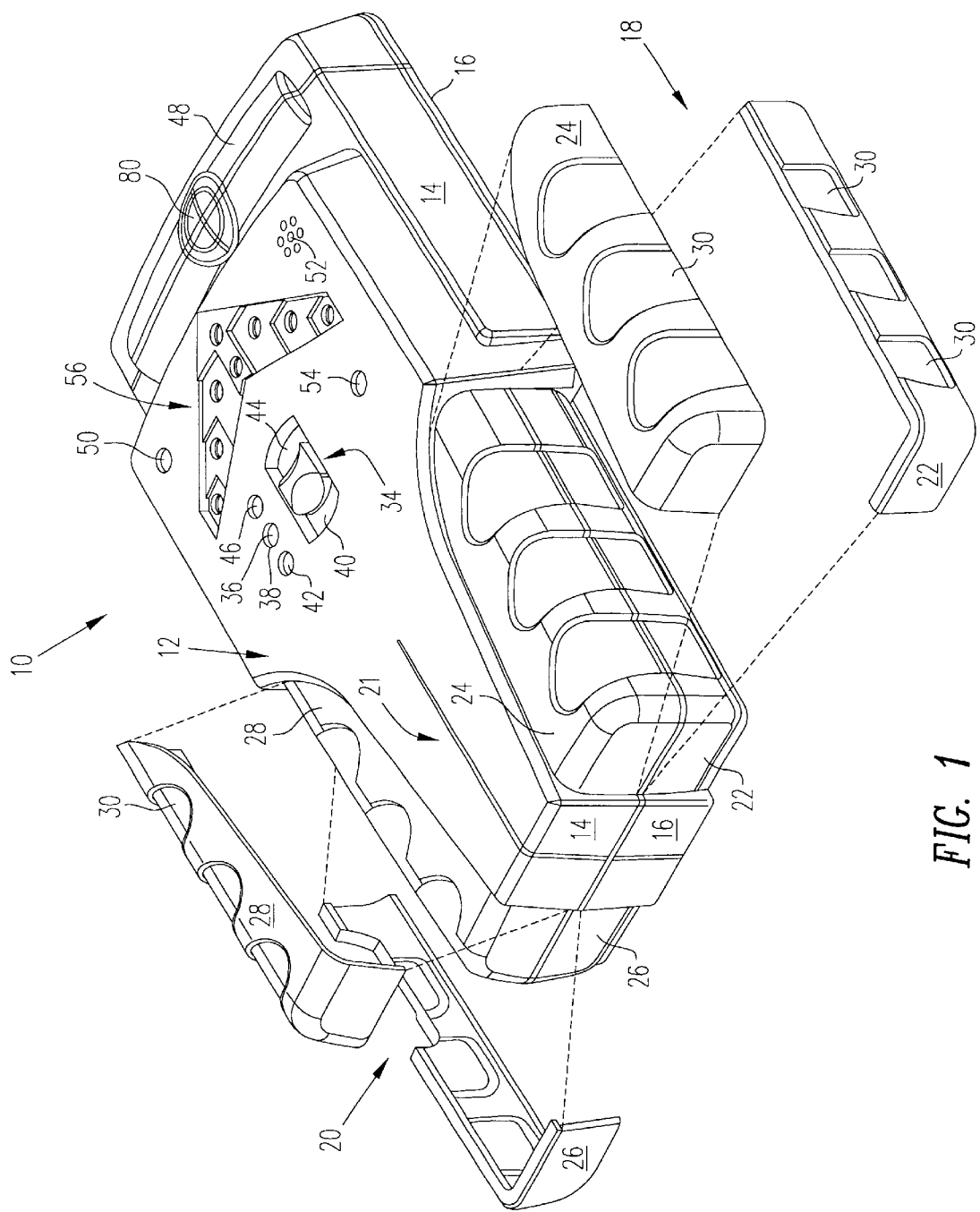
FIG. 1 illustrates a partially exploded perspective view of one embodiment of the hand-held sensor of the present invention.
Figure 2:
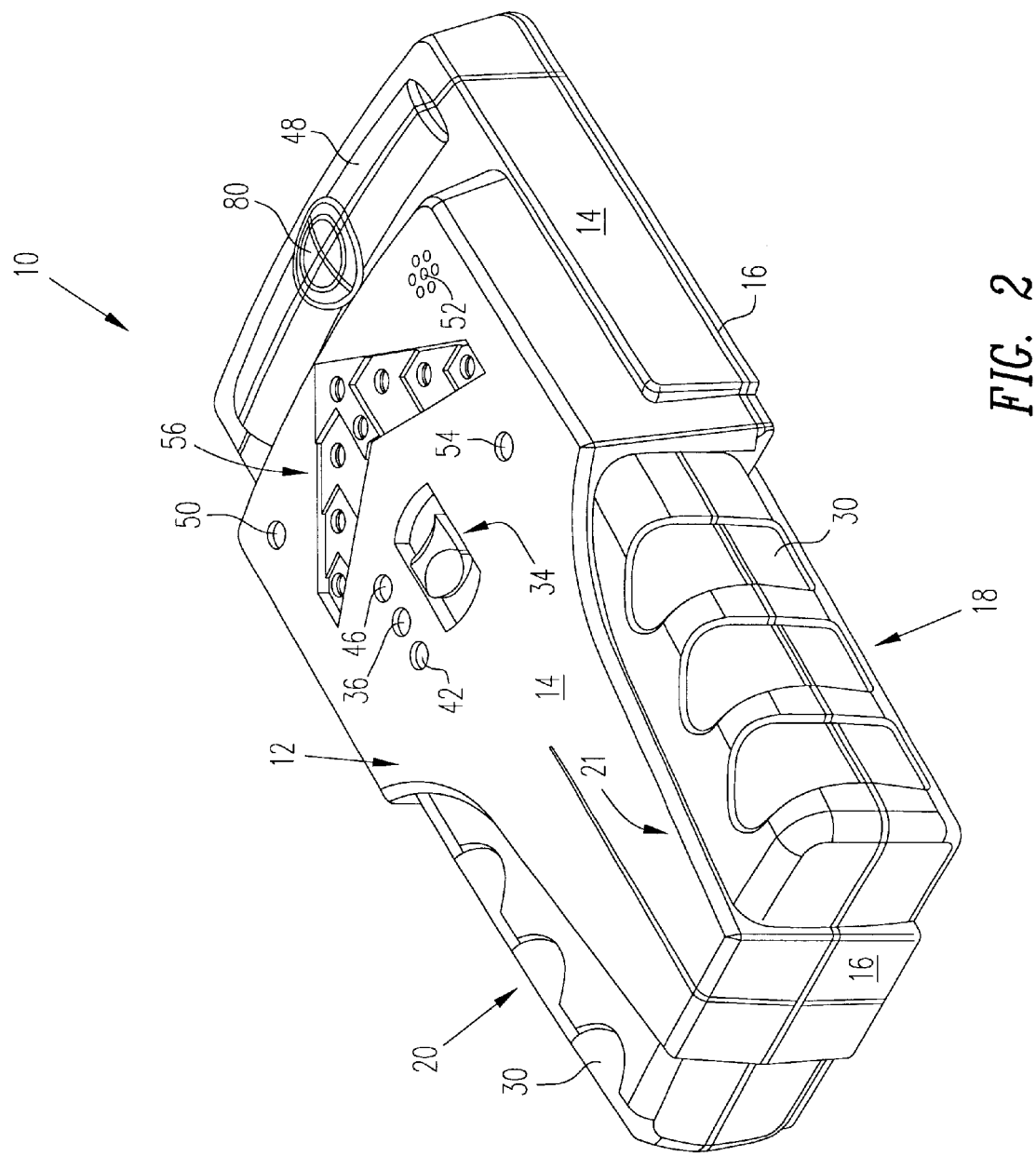
FIG. 2 is a perspective view of the sensor of FIG. 1.

In accordance with one embodiment of the present invention, a hand-held sensor or device is designated generally by the reference numeral 10 in FIGS. 1–3. The sensor 10 includes a casing or housing 12, which conveniently can be formed in an upper casing portion 14 and a lower casing portion 16. The portions 14 and 16 can be formed to snap fit together or can be removably secured together by screws or other conventional securing devices to form the assembled casing 12.

One of the problems presented with the hand-held sensor 10 is the material from which the housing 12 is manufactured. The housing 12 generally is formed from a hard impact resistant, preferably moldable material such as a hard thermoplastic material such as ABS or polystyrene. These hard materials inherently are slippery and easily can become more slippery when greasy or wet and prior art sensors have included pebbling or roughening of the surface and/or adding raised protrusions to assist in gripping of the sensors. The use of soft or low durometer thermoplastic elastomers is becoming popular to improve the grip and feel of hand held devices and tools.

The hand-held sensor 10 includes a pair of grips 18, 20, on a rear end portion 21, with each grip 18, 20 formed in mating half portions 22, 24 and 26, 28 respectively. The portions 22, 24, 26, 28 are adhered or overmolded to the respective upper and lower casing portions 14,16. The grips 18, 20 can be formed from any of the so-called "soft-touch" elastomer materials, such as those sold under the tradenames "Santoprene", "Kraton" and "Monprene". The grips 18, 20 preferably include a plurality of indentations or scallops 30 which provide finger-holds for a user and again assist in resisting slippage or dropping of the hand-held sensor 10. This is especially important for the hand-held sensor 10, since the sensor 10 is held and manipulated in a wide variety of positions and angles, while required to be maintained flat against the surface being scanned.

The electronic circuitry (not illustrated) such as that disclosed in the referenced U.S. Pat. Nos. 4,099,118 and 4,464,622, can provide a multiplicity of functions. The hand-held sensor 10 generally includes an on/off actuator or switch 32 (FIG. 3B), which can be a push-button type actuator. The sensor 10 has a multi-modal operation, selected by the position of a slide activator 34. The structure of the actuator 34 will be more fully described with respect to FIG. 6.

The actuator 34 is illustrated in a center position, which corresponds with the illumination of an LED 36 in an aperture 38. Each LED of the sensor 10 is mounted in or below a like aperture, which will be described in more detail with respect to FIG. 5. In each case, however, the LED can be seen through the aperture, but is mounted such that the top of the LED will not extend above the surface in which the aperture is formed. Thus the LED's are physically protected without the use of any additional shielding members.

The actuator 34 has another first end position 40, which corresponds with the illumination of an LED 42. The actuator 34 has an opposite end position 44, which corresponds with the illumination of an LED 46. The three operational positions, as indicated by the respective illumination of one of the LED's 36, 42 and 46 can correspond to:

(1) Metal sensing.
(2) Deep scan (high sensitivity).
(3) Normal (stud scan).

The operational positions are not critical and the functions can be designated for any one of the positions of the actuator 34 as desired.

The hand-held sensor 10 preferably includes an AC scanning mechanism (not illustrated), which can be located in a front portion 48 of the sensor 10. The actuating of the AC scanner indicating an AC source, in or behind a wall, can be indicated by illumination of an LED 50. An audio signal also can be emitted, such as from a speaker area 52. A final LED 54 can be illuminated when the hand-held sensor has completed a calibration mode, as initiated by the user, typically through operation of the push button actuator 32.

Figure 4:
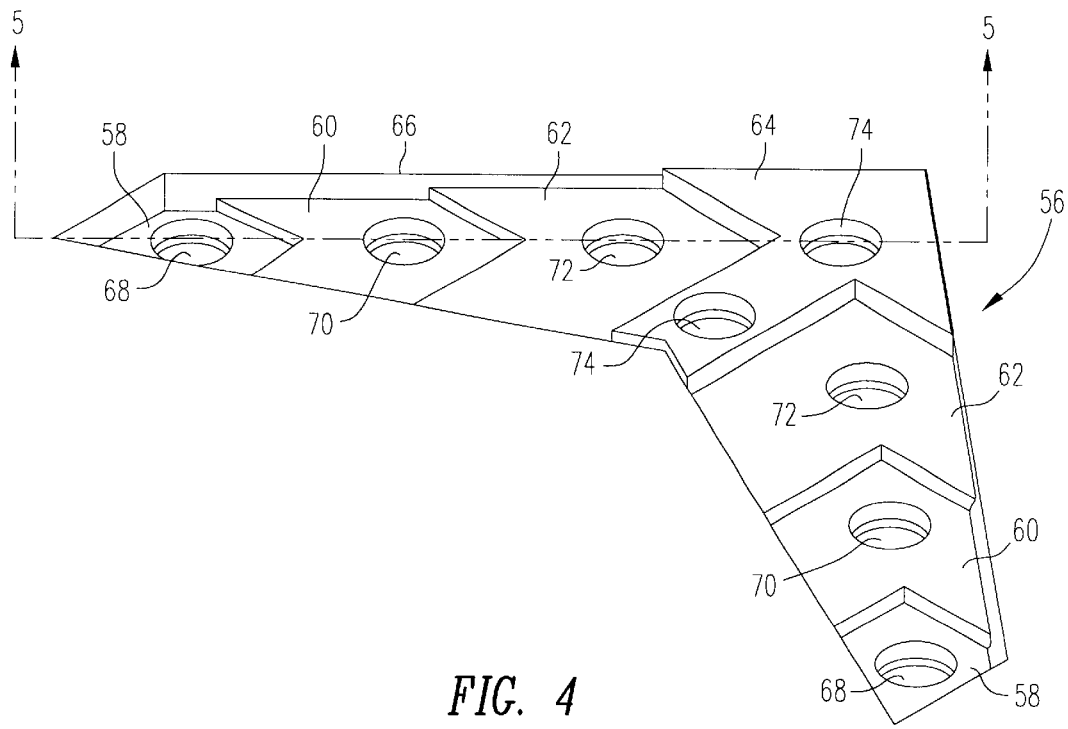
FIG. 4 is a perspective view of a display embodiment of the sensor of FIG. 1.
Figure 5:
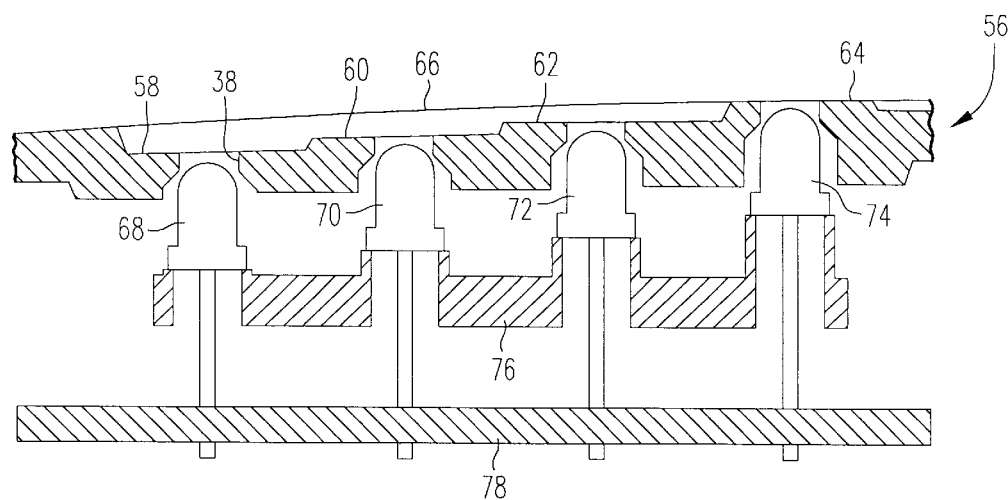
FIG. 5 is a sectional view of the display taken along the line 5—5 of FIG. 4.

A key element of the hand-held device 10 of the present invention is an arrow or wing-shaped LED display array 56, as best illustrated in FIGS. 3A, 4 and 5. The display 56 includes a plurality of arrow-shaped segments formed in operative pairs 58, 60 and 62 and a center arrow segment 64. Each of the segments is offset from one another, both laterally and in depth from a top surface 66 of the housing 12. The segments 58, 60 and 62 are offset or stepped below the surface 66, while the arrow segment 64 is even with the surface 66 (FIG. 5) or preferably raised above the surface 66 (FIGS. 1, 2, 3A, and 4).

Each of the segments 58, 60 and 62 includes an LED aperture 38 (FIG. 5), with the segment 64 including a pair of the apertures 38. Respective pairs of LED's 68, 70, 72, and 74 are mounted into the respective apertures 38. As illustrated in FIG. 5, the LED's 68, 70, 72, and 74 are mounted on a stepped frame 76 and a circuit board or base 78, such that the respective LED's 68, 70, 72 and 74 are mounted to shine through the apertures 38, but are physically located below the surrounding surface area. Thus the LED's 68, 70, 72 and 74 are easily visible to the user, but are recessed into the housing 12 to physically protect the LED's without utilizing a separate cover member.

In operation as the hand-held sensor 10 is scanned over a wall (not illustrated) as an object, such as a stud, is sensed the outer pair of LED's 68 are illuminated, without regard to which side of the sensor 10 the stud is located adjacent to. As the sensor 10 is scanned closer to the object, the next pair of LED's 70 then is illuminated and typically the LED's 68 are turned off. Next the LED's 72 are illuminated and when the sensor 10 is over a first edge of the object the LED's 74 in the center arrow segment 64 are illuminated. The LED'S 74 remain illuminated until the sensor 10 is moved past the object's opposite edge, thus clearly locating the two edges of the object, such as a stud or double stud. The center arrow segment 64 and the LED's 74 preferably are aligned also with a line or groove 80. The aligned LED's 74 , along with the raised arrow segment 64 and the groove 80 form a definitive visual alignment.

The slide actuator 34 is best illustrated in FIGS. 6A–6D. The actuator 34 includes a slide member 82, which includes a slide button 84, mounted on or formed with and on top of a planar slide member 86. The housing portion 14 includes a slide slot 88 into which the slide member 82 can be mounted.

Figure 6A:
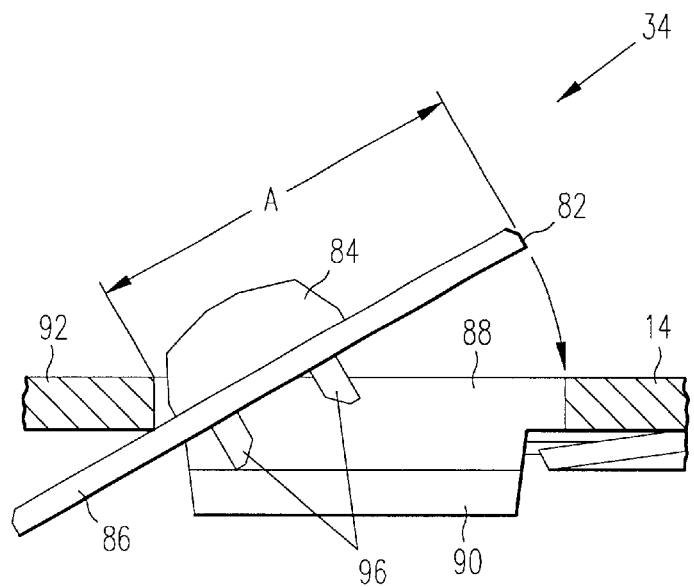
FIGS. 6A–6D are partial sectional side views of an actuator which can be utilized in the sensor of the present invention.

The length of the slot 88 and length "A" are chosen, such that the slide member 82 can be inserted into the slot 88 from the top or outside of the housing 12 as indicated in FIG. 6A. The housing 14 includes a pair of elongated L-shaped support arm flanges (only one of which is illustrated) 90 on opposite sides of the slot 88. The flanges 90 are spaced from a bottom surface 92 of the housing 14 and the end of the slot 88, such that the slide member 82 can be pivoted and slideably engage the flanges 90, as illustrated in FIG. 6B.

The bottom of the slide member 82 preferably includes a recess (not illustrated) in an area 94 between a pair of prongs 96. The prongs 96 preferably are beveled and have a width to fit in a slot (not illustrated) formed between the edges of the support arm flanges 90. A three way switch 98, for example, also can be mounted into the base 78 or another surface as desired. The switch 98 includes a slideable lever or post 100.

Figure 6B:
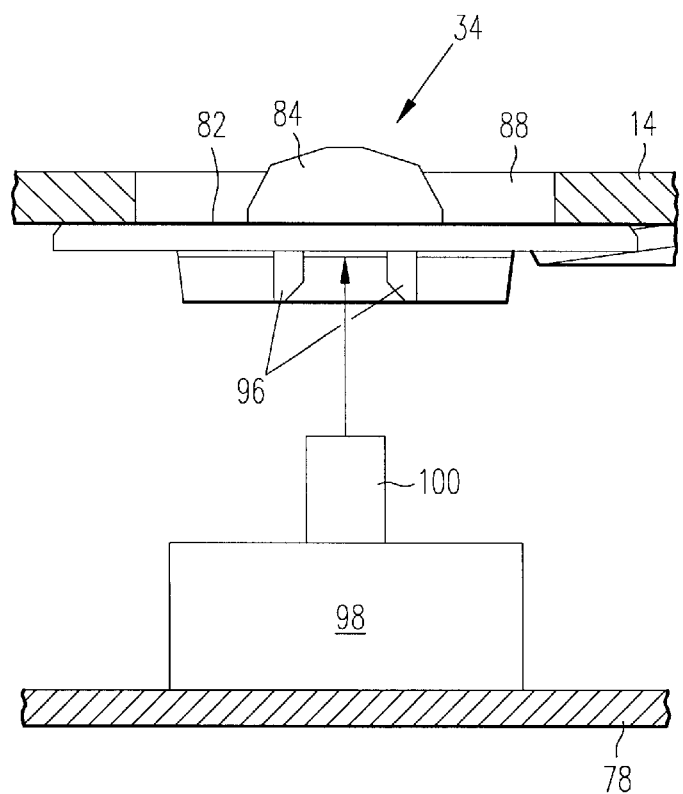
Figure 6C:
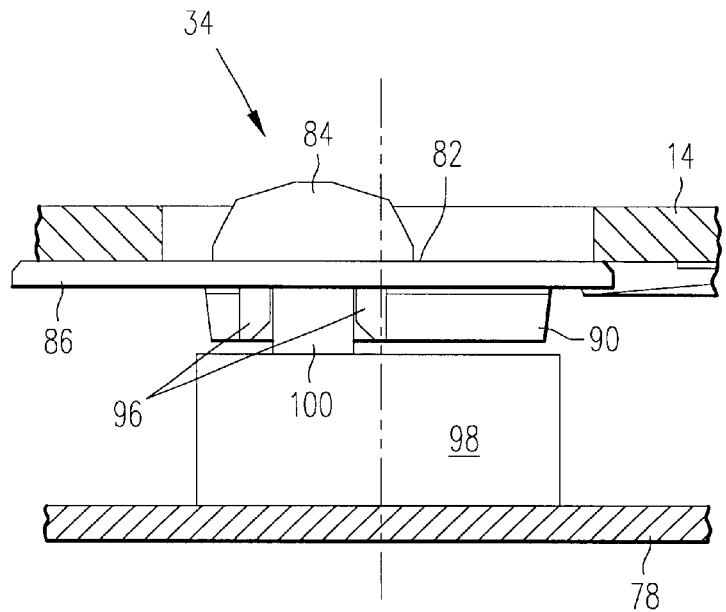
Figure 6D:
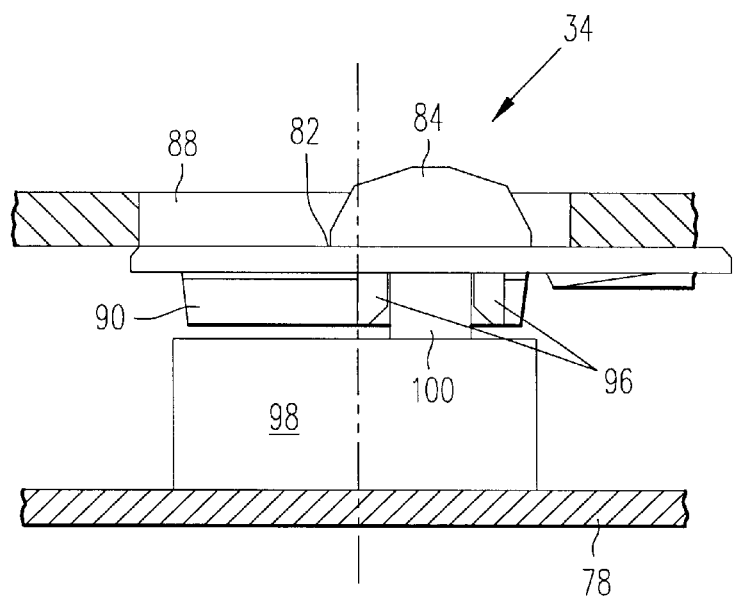

The post 100.s sized to fit between the prongs 96 and into the recess which form a capture structure for the post 100 and the slide member 82, as illustrated in the center position of the actuator 34 in FIG. 6B. The two opposite end actuator positions are illustrated in FIGS. 6C and 6D, with the post 100 seated in the recess, between the prongs 96. As illustrated in FIGS. 6C and 6D, the travel of the switch post 100 determines the length "A" of the slide member 82, such that the slide member 82 is retained in the slot 88 and so that the slide member 82 covers the slot opening 88. This prevents any exposure of the circuitry of the sensor 10. The actuator 34 provides a slide mechanism which can be mounted from the top of the housing 14, but then is retained therein by the switch 98, when the casing portions 14 and 16 are secured together.

Figure 7:
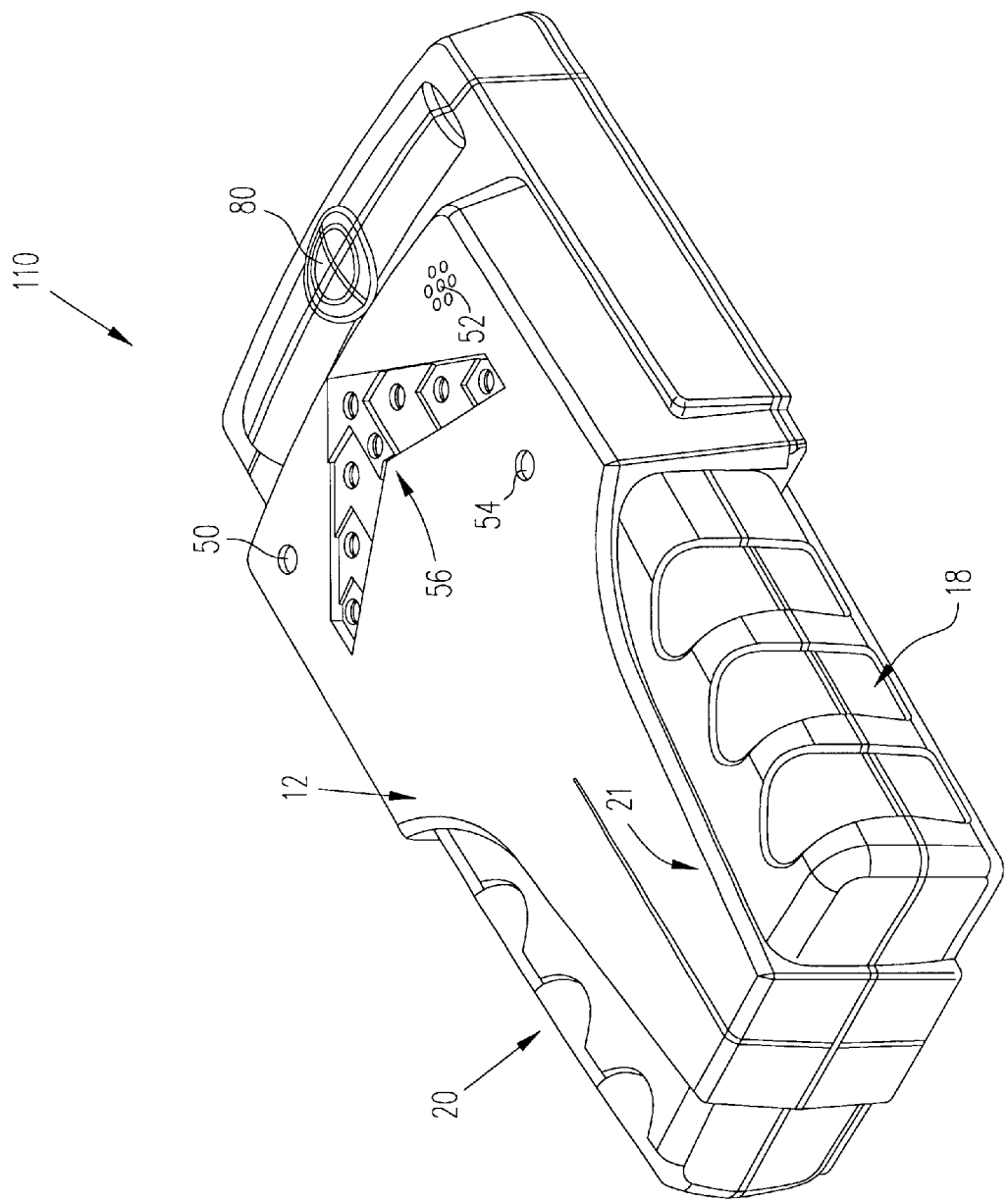
FIG. 7 is a perspective view of a second embodiment of the hand-held sensor or device of the present invention.

Referring to FIG. 7, another hand-held sensor embodiment of the present invention is designated by the reference numeral 110. The sensor 110 is essentially the same as the sensor 10 in physical construction, except the sensor 110 can be physically smaller, since the actuator 34 and attendant structure and function has been removed from the sensor 110. The on/off switch 32 can provide some of the features such as high sensitivity, allowing the sensor 110 to operate either in the normal stud scan or high sensitivity mode.

Although the present invention has been described with reference to particular embodiments, the described embodiments are examples of the present invention and should not be taken as limitations. Although the LED array 56 is stepped in separate segments 58, 60, and 62, it also could be of the same depth or formed in one inclined surface. As will be appreciated by those skilled in the art, various other adaptations and combinations of the embodiments described herein are within the scope of the present invention as defined by the attached claims.

We claim:

1. A hand-held sensor for locating an object behind a surface, said sensor comprising:
   a housing formed of a hard material and having an upper surface and a pair of grips formed on opposite side and top walls of a rear portion of said housing, said grips formed of an elastomeric material that is softer than said housing material; and
   an LED arrow shaped array formed on a front portion of said upper surface, having a central arrow shaped segment aligned with a center line of said housing, with therein;
   said elastomeric grip material including a plurality of scallops spaced along the length thereof.

2. The sensor of claim 1, including said central arrow shaped segment raised above said upper housing surface.

3. A hand-held sensor for locating an object behind a surface, said sensor comprising:
   a housing having an upper surface and a pair of grips formed on opposite side and top walls of a rear portion of said housing;
   an LED arrow shaped array formed on a front portion of said upper surface, having a central arrow shaped segment aligned with a center line of said housing, with said LED's mounted below said upper surface of said housing in apertures formed therein; and
   including a plurality of arrow shaped segments formed in pairs in said array on both sides of said central arrow shaped segment, each segment including at least one LED, and including each of said pair of arrow shaped segments offset in depth from said upper housing surface, and each LED mounted below an upper surface of the respective segment.

4. The sensor of claim 3, including each of said pair of segments formed increasingly offset in depth from said central arrow shaped segment.

5. A hand-held sensor for locating an object behind a surface, said sensor comprising:
   a housing having an upper surface and a pair of grips formed on opposite side and top walls of a rear portion of said housing; and
   an LED arrow shaped array formed on a front portion of said upper surface, having a central arrow shaped segment aligned with a center line of said housing, with said LED's mounted below said upper surface of said housing in apertures formed therein; and,
   including a multiposition slide actuator reciprocally inserted in a slot in said upper housing surface, including said slide actuator mounted on a pair of support arm flanges formed adjacent said slot.

6. The sensor of claim 5, including said slide actuator including a switch post capture structure extending between a space formed between said flanges, said capture structure designed to capture a switch post and actuate the switch via said post when said slide actuator is reciprocated.

7. The sensor of claim 6, including said slide actuator insertable into said slot through said housing to engage said support arm flanges and capture said switch post.

8. A hand-held sensor for locating an object behind a surface, said sensor comprising:
   a housing having an upper surface and pair of grips formed on opposite side and top walls of a rear portion of said housing; and
   an LED arrow shaped array formed on a front portion of said upper surface, having a central arrow shaped segment with a pair of LED's aligned with a center line of said housing, including a plurality of arrow shaped segments formed in pairs in said array on both sides of said central arrow shaped segment, each segment including at least one LED, with said LED's mounted below said upper surface of said housing in apertures formed thereon and each of said pair of arrow shaped segments offset in depth from said upper housing surface and each LED mounted below an upper surface of the respective segment.

9. The sensor of claim 8, including each of said pair of segments formed increasingly offset in depth from said central arrow shaped segment.

10. The sensor of claim 9, including said central arrow shaped segment raised above said upper housing surface.

11. The sensor of claim 10, including said grips formed of a softer elastomeric material than said housing material.

12. The sensor of claim 11, including said elastomeric grip material including a plurality of scallops spaced along the length thereof.

13. A hand-held sensor for locating an object behind a surface, said sensor comprising:
   a housing having an upper surface and pair of grips formed on opposite side and top walls of a rear portion of said housing;
   an LED arrow shaped array formed on a front portion of said upper surface, having a central arrow shaped segment aligned with a center line of said housing, with said LED's mounted below said upper surface of said housing in apertures formed therein; and
   a multiposition slide actuator reciprocally inserted in a slot in said upper housing surface, including said slide actuator mounted on a pair of support arm flanges formed adjacent and extending into said slot below said surface.

14. The sensor of claim 13, including said slide actuator including a switch post capture structure extending between a space formed between said flanges, said capture structure designed to capture a switch post and actuate the switch via said post when said slide actuator is reciprocated.

15. The sensor of claim 14, including said slide actuator insertable into said slot through said housing to engage said support arm flanges and capture said switch post.

16. The sensor of claim 13, including a plurality of arrow shaped segments formed in pairs in said array on both sides of said central arrow shaped segment, each segment including at least one LED.

17. The sensor of claim 16, including each of said pair of arrow shaped segments offset in depth from said upper housing surface and each LED mounted below an upper surface of the respective surface.

18. The sensor of claim 17, including each of said pair of segmented formed increasingly offset in depth from said central arrow shaped segment.

19. The sensor of claim 18, including said central arrow shaped segment raised above said upper housing surface and including a pair of LED's.

20. The sensor of claim 13, including said grips formed of a softer elastomeric material than said housing material.

21. The sensor of claim 20, including said elastomeric grip material including a plurality of scallops spaced along the length thereof.

* * * * *